United States Patent [19]
Jones et al.

[11] Patent Number: 6,000,229
[45] Date of Patent: Dec. 14, 1999

[54] CRYOGENIC PROCESSOR FOR LIQUID FEED PREPARATION OF A FREE-FLOWING FROZEN PRODUCT AND METHOD FOR FREEZING LIQUID COMPOSITION

[75] Inventors: Curt D. Jones, Paducah, Ky.; Milford D. Jones, Grand Chain; Stanley O. Jones, Vienna, both of Ill.

[73] Assignee: Dippin' Dots, Inc., Paducah, Ky.

[21] Appl. No.: 09/066,140

[22] Filed: Apr. 24, 1998

[51] Int. Cl.[6] .............................. F25C 1/00; F25D 17/02
[52] U.S. Cl. ..................................... 62/74; 62/64; 62/373
[58] Field of Search .................................. 62/64, 67, 74, 62/373, 374, 375, 376

[56] References Cited

U.S. PATENT DOCUMENTS

| | | | |
|---|---|---|---|
| 1,538,730 | 5/1925 | Obersohn et al. | 222/420 |
| 1,612,167 | 12/1926 | Beardsley et al. | |
| 2,708,055 | 5/1955 | Alexander | 222/478 |
| 2,715,484 | 8/1955 | Alexander | 222/478 |
| 2,875,588 | 3/1959 | Berger | 62/74 |
| 3,023,171 | 2/1962 | Smith | 252/359 |
| 3,060,510 | 10/1962 | Fischer et al. | 18/47.2 |
| 3,162,019 | 12/1964 | Porter et al. | 62/67 |
| 3,228,838 | 1/1966 | Rinfret et al. | 167/74 |
| 3,276,847 | 10/1966 | Duff et al. | 222/420 |
| 3,344,617 | 10/1967 | Rinfret et al. | 62/322 |
| 3,662,104 | 5/1972 | Nordseth et al. | 178/6.8 |
| 3,857,974 | 12/1974 | Aref et al. | 426/148 |
| 4,251,547 | 2/1981 | Liggett | 426/1 |
| 4,468,727 | 8/1984 | Carrison et al. | 364/200 |
| 4,479,363 | 10/1984 | Gibson et al. | 62/63 |
| 4,565,100 | 1/1986 | Malinoff | 73/863 |
| 4,616,272 | 10/1986 | Moriyama | 360/47 |
| 4,655,047 | 4/1987 | Temple et al. | 62/64 |
| 4,687,672 | 8/1987 | Vitkovsky | 426/524 |
| 4,704,873 | 11/1987 | Imaike et al. | 62/64 |
| 4,748,817 | 6/1988 | Oura et al. | 62/74 |
| 4,843,840 | 7/1989 | Gibson | 62/375 |
| 5,077,592 | 12/1991 | Janesick | 357/24 |
| 5,126,156 | 6/1992 | Jones | 426/418 |
| 5,250,824 | 10/1993 | Janesick | 257/216 |
| 5,348,606 | 9/1994 | Hanaway et al. | 156/292 |
| 5,499,195 | 3/1996 | Castelaz | 364/516 |
| 5,661,981 | 9/1997 | Laux et al. | 62/64 |
| 5,664,422 | 9/1997 | Jones | 62/64 |

FOREIGN PATENT DOCUMENTS

| | | |
|---|---|---|
| 964921 | 3/1975 | Canada. |
| 332 287 | 1/1989 | European Pat. Off.. |
| 641 522 A3 | 7/1994 | European Pat. Off.. |
| 780138049 | 9/1978 | Japan. |
| 790173530 | 12/1979 | Japan. |
| 900205121 | 3/1990 | Japan. |
| 1264439 | 2/1972 | United Kingdom. |
| 1376972 | 12/1974 | United Kingdom. |
| 2092880 | 8/1982 | United Kingdom. |

OTHER PUBLICATIONS

Hearing, Dippin' Dots, Inc. and Curt D. Jones v. Thomas R. Mosey, Dots of Fun and International Laser Expressions, Inc., vols. 1 and 2, Jan. 21, 1998, wherein prior art was discussed, pp. 3–370.

*Primary Examiner*—William Doerrler
*Attorney, Agent, or Firm*—Thomas, Kayden, Horstemeyer & Risley

[57] ABSTRACT

A cryogenic processor for liquid feed preparation of a free-flowing frozen product incorporates a gas diffusion chamber that inhibits freezing of a droplet producing feed assembly and pre-cools liquid droplets during the production of the free-flowing frozen product. This is accomplished by providing a regulated flow of ambient air about the feed assembly in conjunction with a vacuum assembly which is used to remove excess refrigerant vapor from the gas diffusion chamber. The vacuum assembly is incorporated into the gas diffusion chamber between the feed assembly and a freezing chamber. The gas diffusion chamber also provides additional physical separation between the feed assembly and the freezing chamber to allow for pre-cooling of the falling liquid composition droplets prior to contacting liquid refrigerant in the freezing chamber therebelow. Additionally, the shape of the processor has been adapted to reduce refrigerant requirements and improve overall production efficiency.

26 Claims, 2 Drawing Sheets

CRYOGENIC PROCESSOR FOR LIQUID FEED PREPARATION OF A FREE-FLOWING FROZEN PRODUCT AND METHOD FOR FREEZING LIQUID COMPOSITION

FIELD OF THE INVENTION

The present invention relates generally to a frozen product preparation apparatus and, more particularly, to a cryogenic processor for liquid feed preparation of a free-flowing frozen product and a method for its use in freezing a liquid composition.

DESCRIPTION OF THE PRIOR ART

Sales of ice cream and frozen yogurt products have risen dramatically in recent years. The applicant herein has captured a portion of this product market through the development of a unique novelty ice cream, frozen yogurt and ice product in the form of beads. This product, marketed under the trademarks "Dippin' Dots®" and "Ice Cream of the Future®", has become very popular in specialty stores and at fairs and theme parks.

The applicant has proprietary rights in the method of preparing and storing the product pursuant to U.S. Pat. No. 5,126,156, issued Jun. 30, 1992, herein incorporated by reference, as well as rights associated with improvements pursuant to U.S. Pat. No. 5,664,422, issued Sep. 9, 1997, herein incorporated by reference. As is generally described therein, the patented method involves delivering flavored liquid dairy and other alimentary compositions to a feed tray and then dripping the composition into a freezing chamber. The feed tray comprises a plurality of orifices through which liquid composition passes so that droplets form and fall into the freezing chamber. Each orifice may also have a corresponding feed dropper which is downwardly disposed in relation to the tray such that the liquid composition passes from the tray through an orifice and then through an associated feed dropper where a droplet is formed. The orifices or combination of orifices and feed droppers will hereinafter be referred to collectively as feed assemblies.

The falling droplets of liquid composition freeze rapidly in the freezing chamber due to the presence of both gaseous and liquid refrigerant in the area between the orifices and the bottom of the freezing chamber, thereby forming solid beads of flavored ice cream, yogurt or other alimentary products, such as flavored ice. The frozen beads are removed from the freezing chamber and packed for distribution and later consumption.

For economic efficiency, it is important to utilize as many BTU's as possible from the liquid refrigerant during the droplet freezing process. This is typically done by utilizing the gaseous portion of the refrigerant generated from the heat of the liquid composition as it is being frozen to pre-cool the falling droplets prior to entering the liquid refrigerant. However, if the gaseous refrigerant is allowed to completely surround the feed assembly, a freeze-up of liquid composition in the assembly can potentially occur resulting in a reduced product output. Therefore, excess cold gaseous refrigerant around the assembly is undesirable. In order to improve the production process, a method which reduces the possibility of feed assembly freeze-up and thereby allows the feed assemblies to remain unobstructed of frozen composition during operation is desired. A temperature balance between the feed assembly and the the upper portion of the freezing chamber is required so that free flow of the liquid composition through the feed assemblies is achieved resulting in the continuous formation of uniform frozen beads.

Accordingly, a need is identified to sufficiently pre-cool the falling droplets prior to contacting the liquid refrigerant in the freezing chamber while ensuring that the flow channels of the feed assemblies remain unobstructed of frozen feed composition which could otherwise inhibit the free flow of droplets. Therefore, improving the pre-cooling characteristics of the freezing chamber while preventing liquid composition from freezing in the feed assembly flow channels will result in improving the efficiency of frozen beaded product manufacture.

SUMMARY OF THE INVENTION

The present invention is generally directed to an improved cryogenic processor for liquid feed preparation of a free-flowing frozen product and a method for its use. It has been determined through experimentation that structural modifications can be made to the prior art apparatus to bring about the desired result. A primary object of the present invention is to provide an improved cryogenic processor incorporating a gas diffusion chamber that will substantially eliminate the formation of frozen product in the feed assembly during the production of the free-flowing frozen product.

An additional object of the present invention is to provide an increased falling distance for the formed droplets measured from the feed assembly to the freezing chamber, so that the droplets will be provided with additional cooling time, so that a reduced amount of refrigerant is required to cool each droplet.

It is an additional object of the present invention to provide a means for adjusting the level of gaseous refrigerant contained in the gas diffusion chamber, so that the operation of the system can be adjusted for different ambient conditions.

It is another object of the present invention to provide a means for adjusting the level of liquid refrigerant contained in the freezing chamber.

It is still another object of the present mention to provide an improved structure to the interior of the freezing chamber to prevent incoming liquid refrigerant from forming a cyclone effect which prevents the frozen beads from exiting the chamber uniformly for packaging.

It is yet another object of the present invention to provide a means for automatically controlling the production of the free-flowing frozen product.

Additional objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved cryogenic processor for liquid feed preparation of a free-flowing frozen product and a method for its use, that achieves the stated goals are presented.

The cryogenic processor comprises a tray that receives liquid feed composition from a delivery source. The liquid composition may be mixed with other substances in predetermined amounts in a premixing device. A plurality of orifices or combination of orifices and feed droppers, hereinafter feed assembly, associated with the tray are specifically arranged and adapted for discharging uniformly sized droplets of the liquid composition from the tray. In a key aspect of the improvement, a regulated flow of ambient air is provided to the feed assembly by a venturi assembly or other source of partial vacuum. The vacuum assembly allows ambient air to be pulled into the cryogenic processor and across the feed assembly which prevents liquid composition from freezing and accumulating in the flow channels of the feed assembly, thus allowing continuous formation of uniformly sized beads. Adjustable door inlets are also adapted and arranged as a means to control the flow of incoming ambient air, as well as the flow of outgoing gaseous refrigerant. The ambient air also can be filtered for specific applications.

The vacuum assembly described above is incorporated in the exit port of a gas diffusion chamber which is arranged between the feed assembly and the freezing chamber. The gas diffusion chamber not only facilitates ambient air flow, it also provides the additional separation between the feed assembly and the freezing chamber to allow for pre-cooling of the falling droplets prior to contacting the liquid refrigerant in the freezing chamber therebelow. The height of the gas diffusion chamber also can be adjusted during manufacture depending on the liquid to be frozen. The height of the chamber can be critical for proper bead formation because some liquids have a tendency to form non-uniform beads when the drop height is too high. Other liquids, such as those with a high water content and low levels of sugar or other solutes, may require a higher drop height in order to allow the droplets to fall through the refrigerant vapor for a longer period of time so that the center of the droplet is pre-cooled sufficiently prior to the exterior of the droplet contacting the liquid refrigerant. If the center of a droplet is not sufficiently pre-cooled prior to the outer frozen crust of the droplet impacting the liquid refrigerant, the improperly pre-cooled center of the drop can expand at a sufficiently rapid rate to crack, rupture or otherwise deform the uniformity of the frozen droplet.

The gas diffusion chamber also incorporates an ambient air inlet port, arranged at substantially 90° to 180° from the exit port, which communicates with the vacuum assembly. Both the exit port and the ambient air inlet port are adapted to adjust the height of the gaseous refrigerant in the gas diffusion chamber as well as the volume of incoming ambient air passing across the feed assembly. The velocity of the incoming ambient air can also be varied by adjusting the strength of the vacuum produced by the vacuum assembly. However, if excess vacuum is generated without the proper addition of ambient air, then excess evaporation of the liquid refrigerant is achieved which can be detrimental to freezing efficiency. Likewise, if excess ambient air is introduced to the gas diffusion chamber, the temperature of the gaseous refrigerant is unnecessarily raised resulting in a decrease in droplet pre-cooling efficiency, as well as a decrease in post-cooling efficiency for processes using the exit gases. Therefore, for maximum efficiency, temperatures must be monitored closely at various locations in the gas diffusion chamber. This configuration limits the amount of refrigerant required to carry out the freezing function while promoting formation of a uniform frozen beaded product, thereby reducing production costs. Additionally, increased conical shaping of the freezing chamber allows for increased output rates of frozen beaded product at the outlet of the freezing chamber due to the efficient accumulation of frozen beads at the bottom of the freezing chamber.

As described above, the invention herein disclosed also contemplates control by automatic means. Several sensors have been included to provide appropriate control device inputs to achieve this function. Sensor inputs may include, among others: freezer chamber refrigerant level; freezer chamber temperatures at various points; gas diffusion chamber temperatures at various points; liquid composition levels and rates of flow; and, frozen product output measurements. Sensor signals are transmitted to a control device which interprets the data through appropriate means and supplies control output signals directed to individual processor components in order to facilitate a continuous and automated or semi-automated production process.

Still other objects of the present invention will become apparent to those skilled in the art from the following description wherein there is shown and described a preferred embodiment of this invention, simply by way of illustration of one of the modes best suited to carry out the invention. As will be realized, the invention is capable of other different embodiments and uses, and its several details are capable of modification in various, obvious aspects all without departing from the invention. Accordingly, the drawings and descriptions will be regarded as illustrative in nature and not as restrictive.

By means of example, the present invention is equally well suited to a variety of applications other than producing frozen dairy and other food products. Industries utilizing forms of freezing technology, such as: the pharmaceutical industry, which flash freezes enzymes and additives; the animal feed industry, which flash freezes yeast products, bacteria and enzymes; and, the health care industry which freezes blood and other fluids, may all utilize this device.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE INVENTION

Figure 1:
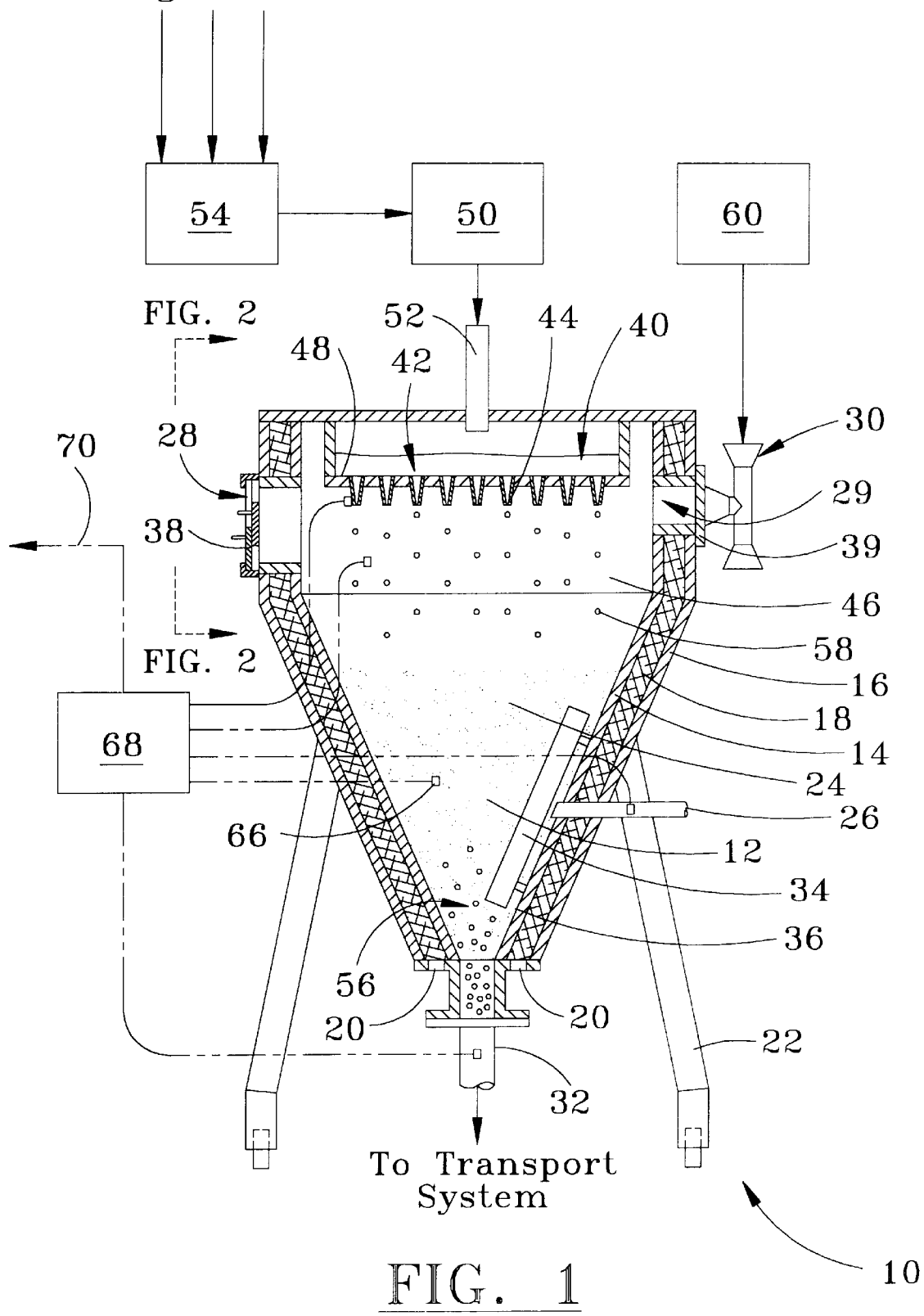
FIG. 1 is a cross-sectional elevation of the improved cryogenic processor.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Reference is now made to FIG. 1 showing an improved cryogenic processor constructed in accordance with the preferred embodiment of the present invention to produce free-flowing frozen product in the form of small beads. The fundamental method utilized to produce the product is described in detail in U.S. Pat. No. 5,126,156, and will be summarized below in order to facilitate an understanding of this unique production process. The apparatus as depicted in FIG. 1 enhances the efficiency of the prior art production process and increases product yield as described below.

Cryogenic processor 10 includes a freezing chamber 12 that is most preferably in the form of a conical tank that holds a liquid refrigerant therein. Freezing chamber 12 incorporates an inner shell 14 and an outer shell 16. Insulation 18 is disposed between the inner shell 14 and outer shell 16 in order to increase the thermal efficiency of the chamber 12. Vents 20 are also provided to ventilate the insulated area formed between the shells 14 and 16. The freezing chamber 12, as shown in FIG. 1, is a free-standing unit supported by legs 22. Alternatively, the freezing chamber 12 may be disposed in a frame that is specially built to support the processor 10 while in use.

Refrigerant 24, preferably liquid nitrogen in view of its known freezing capabilities, enters the freezing chamber 12 by means of refrigerant inlet 26. Refrigerant 24 entering chamber 12 through inlet 26 is used to maintain a predetermined level of liquid refrigerant in the freezing chamber and must be added to replace refrigerant 24 that is lost by evaporation or by other means incidental to production. Gaseous refrigerant that has evaporated from the surface of the liquid refrigerant 24 in freezing chamber 12 primarily vents to the atmosphere through exit port 29 which cooperates with the vacuum assembly 30, which can be in the form of a venturi nozzle. Extraction of the frozen beads occurs through product outlet 32 adapted at the base of the freezing chamber 12.

When incoming refrigerant 24 enters the freezing chamber 12 through inlet 26, a swirling or cyclonic motion of refrigerant 24 may form in freezing chamber 12 depending on the amount of refrigerant 24 allowed to enter through inlet 26 and the flow velocity of the incoming refrigerant 24. This cyclonic motion is not favorable to the production process because the frozen beads awaiting extraction at the bottom of freezing chamber 12 may be swept into the swirling refrigerant and thus prevented from falling to the bottom of the freezing chamber for collection. A non-uniform beaded product can also be produced in this turbulent environment. This unwanted cyclonic motion of the incoming refrigerant is prevented by baffles 34 mounted to interior surface 36 of inner shell 14. Baffles 34 extend inwardly from interior surface 36 in the vicinity of the refrigerant inlet 26. Additionally, the baffles 34 are oriented so that their lengths are substantially vertical within the freezing chamber 12.

An ambient air inlet port 28 with adjustment doors 38 and exit port 29 with adjustment doors 39 are provided to adjust the level of gaseous refrigerant which evaporates from the surface of the liquid refrigerant 24 so that excessive pressure is not built up within the processor 10 and freezing of the liquid composition in the feed assembly 40 does not occur.

A feed tray 48 receives liquid composition from a delivery source 50. Typically, a pump (not shown) drives the liquid composition through a delivery tube 52 into the feed tray 48. A premixing device 54 allows several compositions, not all of which must be liquid, such as powdered flavorings or other additives of a size small enough not to cause clogging in the feed assembly 40, to be mixed in predetermined concentrations for delivery to the feed tray 48.

It is recognized that in order to create uniformly sized beads 56 of frozen product, uniformly sized droplets 58 of liquid composition are required to be fed through gas diffusion chamber 46 to freezing chamber 12. The feed tray 48 is designed with feed assembly 40 that forms droplets 58 of the desired character. The frozen product takes the form of beads that are formed when the droplets 58 of liquid composition contact the refrigerant vapor in the gas diffusion chamber 46, and subsequently the liquid refrigerant 24 in the freezing chamber 12. After the beads 56 are formed, they fall to the bottom of chamber 12. A transport system connects to the bottom of chamber 12 at outlet 32 to carry the beads 56 to a packaging and distribution network for later delivery and consumption.

In a key aspect of the invention, the preferred embodiment is designed with an incorporated vacuum assembly 30 which can take the form of a venturi. The vacuum assembly 30 cooperates with air inlet 28 and adjustment doors 38 so that an ambient air flow passes through the inlet and around feed assembly 40 to ensure that no liquid composition freezes therein. This is accomplished by mounting the vacuum assembly 30 and air inlet 28 on opposing sides of the gas diffusion chamber 46 such that the incoming ambient air drawn by the vacuum assembly 30 is aligned with the feed assembly. In this configuration, ambient air flows around the feed assembly warming it to a sufficient temperature to inhibit the formation of frozen liquid composition in the feed assembly flow channels. Air source 60, typically in the form of an air compressor, is attached to vacuum assembly 30 to provide appropriate suction to create the ambient air flow required.

Figure 2:
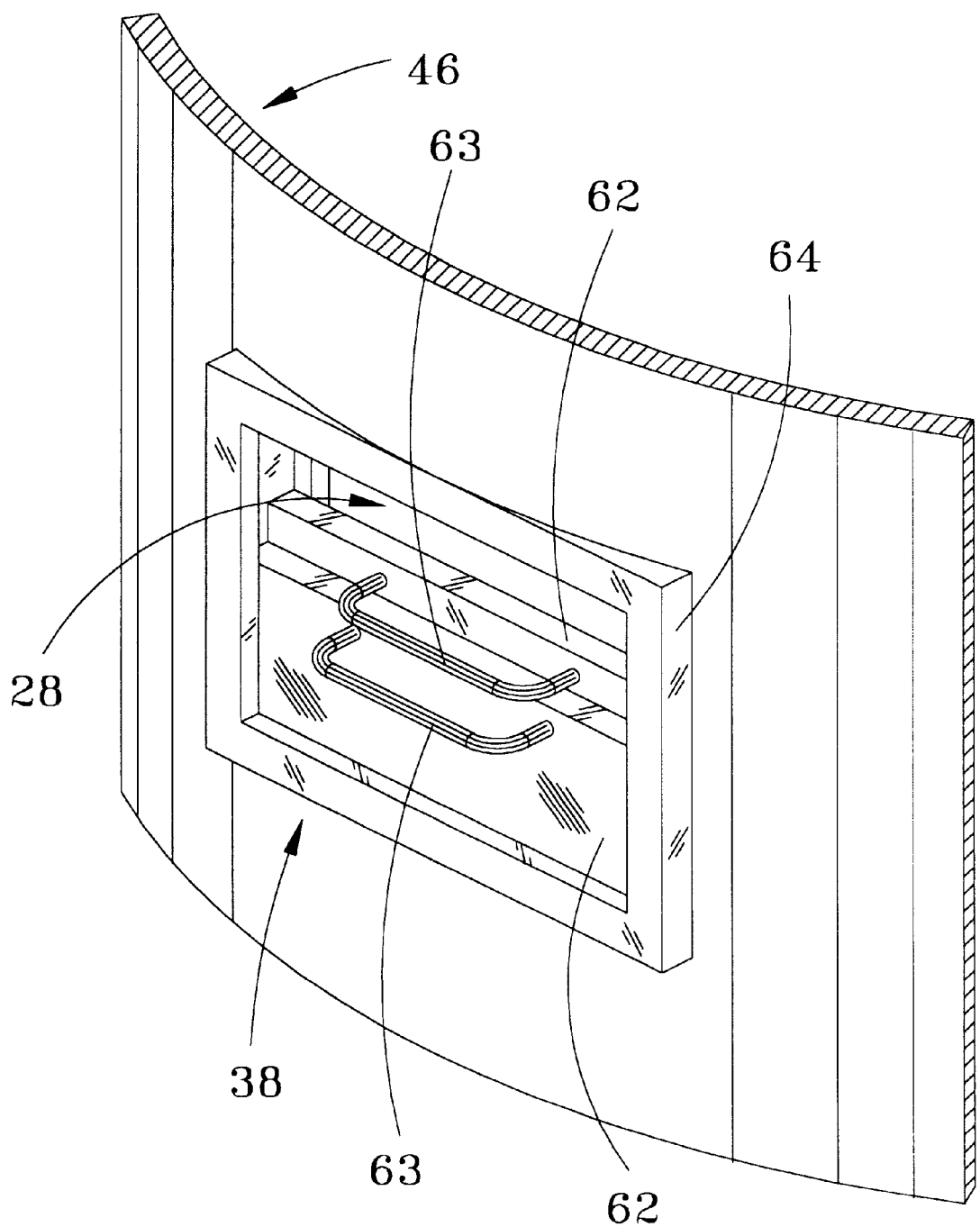
FIG. 2 is a cut-away perspective view of the adjustable air inlet doors.

As mentioned above, air inlet 28 incorporates adjustment doors 38 for controlling the amount of incoming ambient air. As shown in FIG. 2, the preferred embodiment of the doors 38 is a series of slidable door segments 62 mounted within a frame 64. This configuration provides for numerous adjustment combinations so that the desired flow rates may be achieved between a full open setting where the doors 38 expose a maximum size inlet opening and a full closed setting where the doors completely block the inlet 28, thereby preventing ambient air flow. It should be recognized by those of ordinary skill in the art that numerous other embodiments of the inlet doors 38 may be used for achieving the desired results, i.e. a variable flow nozzle, or an adjustable inlet vent, to mention but a few.

Several sensors 66 may be incorporated to measure numerous operating values, such as freezing chamber temperature, refrigerant level, etc. These sensors each provide an input signal to control device 68 which monitors the production process and provides control output signals 70 to facilitate automatic production of the frozen beads. For purposes of illustration, these sensors have been included in FIG. 1 simply as dots. It will be appreciated, however, that the actual structure of the sensors will vary in accordance with the actual implementation.

Numerous benefits result from the use of the improved invention. In contrast to prior art designs where the freezing of liquid composition in the feed assembly created the need to discontinue the production process while the feed assembly was warmed and subsequently cleaned, the present invention prevents the liquid from freezing in the feed assembly. Thus, the production process may continue uninterrupted.

Additionally, improperly frozen liquid composition represents waste which must be screened and removed from the uniform beaded product prior to packaging. This waste and the processes associated with removing the waste from the desired product, e.g. operation of separation devices, decreases production efficiency. The present invention eliminates this waste. By use of the novel gas diffusion chamber and vacuum assembly, the need for a separation requirement is successfully eliminated, thus the prior art screening components and the power utilized to operate them are no longer required.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A cryogenic processor for liquid feed preparation of a free-flowing frozen product comprising:

a freezing chamber having a substantially conical shape;

a gas diffusion chamber formed above said freezing chamber;

a feed tray overlying said gas diffusion chamber arranged and adapted to receive liquid composition from a delivery source, said tray having a plurality of orifices for regulating discharge of uniformly sized droplets of said composition from said tray, said plurality of orifices having an associated plurality of feed droppers for producing droplets from the liquid composition, whereby said droplets are delivered by gravity through said gas diffusion chamber and then into said freezing chamber therebelow;

said gas diffusion chamber having a vacuum assembly and an air inlet both in fluid communication with said gas diffusion chamber, said vacuum assembly arranged and adapted to draw ambient air through said air inlet and into said gas diffusion chamber to establish a controlled air flow about said orifices to prevent liquid composition from freezing in said orifices or their associated feed droppers, said air inlet having a means for adjustment, such that said means for adjustment regulates the amount of incoming ambient air.

2. A cryogenic processor as in claim 1, in which said freezing chamber is further defined as having an interior surface and a means for baffling fluid flow, said means for baffling arranged and attached to said interior surface of said freezing chamber such that incoming liquid refrigerant is prevented from creating a disruptive cyclonic flow within the freezing chamber.

3. A cryogenic processor as in claim 2, in which said freezing chamber is further defined by an inner shell and an outer shell, and thermal insulation disposed between said inner shell and said outer shell.

4. A cryogenic processor as in claim 3, in which said gas diffusion chamber is further defined by an inner shell and an outer shell, and thermal insulation disposed between said inner shell and said outer shell.

5. A cryogenic processor as in claim 4, in which said inner shell and said outer shell of said freezing chamber are further defined as having a means for venting an area formed between said shells.

6. A cryogenic processor as in claim 5, in which said inner shell and said outer shell of said gas diffusion chamber are further defined as having a means for venting an area formed between said shells.

7. A cryogenic processor as in claim 6, in which said processor is further defined as having a delivery source capable of providing liquid composition to the tray of said cryogenic processor.

8. A cryogenic processor as in claim 7, in which said processor is further defined as having a premixing device capable of combining a plurality of compositions in desired concentrations and providing the mixed combination to the delivery source of said cryogenic processor.

9. A cryogenic processor as in claim 8, further comprising:

a control device having a plurality of sensors, said sensors attached to said cryogenic processor such that numerous operating values are measured and sent to said control device as input signals, said input signals interpreted by an appropriate algorithm in a control device such that an output signal is created and sent from the control device to said cryogenic processor which allows for automatic monitoring and production of frozen beaded product.

10. A method of feeding liquid composition to a freezing chamber containing a refrigerant to form beads of frozen product, comprising the steps of:

delivering a liquid feed composition from a source to a feed tray;

discharging said liquid feed composition from said feed tray through a plurality of orifices in the form of droplets, via gravity, into a gas diffusion chamber disposed immediately below said plurality of orifices, said plurality of orifices having an associated plurality of feed droppers for producing droplets from the liquid composition;

delivering said droplets into a freezing chamber disposed immediately below said gas diffusion chamber;

providing an intensely cold environment in said gas diffusion chamber and in said freezing chamber, whereby the droplets become substantially pre-cooled during a free fall; and providing an ambient air flow through said gas diffusion chamber and about said plurality of orifices by utilizing a vacuum assembly and an air inlet both in fluid communication with said gas diffusion chamber, said vacuum assembly arranged and adapted to draw ambient air through said air inlet and into said gas diffusion chamber to establish a controlled air flow about the orifices to prevent liquid composition from freezing in said orifices, said air inlet having a means for adjustment, such that said means for adjustment regulates the amount of incoming ambient air.

11. The method as in claim 10, in which said freezing chamber is further defined as having an interior surface and a means for baffling fluid flow, said means for baffling arranged and attached to said interior surface of said freezing chamber such that incoming refrigerant is prevented from creating a disruptive cyclonic flow within the freezing chamber.

12. The method as in claim 11, in which said freezing chamber is further defined by an inner shell and an outer shell, and thermal insulation disposed between said inner shell and said outer shell.

13. The method as in claim 12, in which said gas diffusion chamber is further defined by an inner shell and an outer shell, and thermal insulation disposed between said inner shell and said outer shell.

14. The method as in claim 13, in which said inner shell and said outer shell of said freezing chamber are further defined as having a means for venting an area formed between said shells.

15. The method as in claim 14, in which said inner shell and said outer shell of said gas diffusion chamber are further defined as having a means for venting an area formed between said shells.

16. The method as in claim 15, in which said processor is further defined as having a delivery source capable of providing liquid composition to the tray of said cryogenic processor.

17. The method as in claim 16, in which said processor is further defined as having a premixing device capable of combining a plurality of compositions in desired concentrations and providing the mixed combination to the delivery source of said cryogenic processor.

18. The method as in claim 17, further comprising the step of:
automatically controlling the production of frozen beaded product by incorporating a control device capable of monitoring several operating parameters selected from the group consisting of freezer chamber liquid refrigerant level, rate of refrigerant input, freezer chamber temperature, gas diffusion chamber temperature, rate of incoming ambient air, rate of liquid composition input, and rate of frozen product output; and providing control output signals from said control device capable of adjusting the operating parameters of the processor.

19. A cryogenic processor as in claim 1, wherein said means for adjustment comprises at least one door adjustable between a full open setting and a full closed setting such that adjustment of said door regulates the amount of incoming ambient air.

20. A cryogenic processor as in claim 2, wherein said means for baffling comprises at least one baffle arranged and attached to said interior surface of said freezing chamber and extending into an interior of said freezing chamber such that incoming refrigerant is prevented from creating a disruptive cyclonic flow within the freezing chamber.

21. A cryogenic processor as in claim 5, wherein said means for venting an area formed between said shells of said freezing chamber comprises at least one vent in fluid communication between said area formed between said shells of said freezing chamber and an exterior of said cryogenic processor.

22. A cryogenic processor as in claim 6, wherein said means for venting an area formed between said shells of said gas diffusion chamber comprises said area formed between said shells of said gas diffusion chamber and said area formed between said shells of said freezing chamber being in fluid communication with each other.

23. The method as in claim 10, wherein said means for adjustment comprises at least one door adjustable between a full open setting and a full closed setting such that adjustment of said door regulates the amount of incoming ambient air.

24. The method as in claim 11, wherein said means for baffling comprises at least one baffle arranged and attached to said interior surface of said freezing chamber and extending into an interior of said freezing chamber such that incoming refrigerant is prevented from creating a disruptive cyclonic flow within the freezing chamber.

25. The method as in claim 14, wherein said means for venting an area formed between said shells of said freezing chamber comprises at least one vent in fluid communication between said area formed between said shells of said freezing chamber and an exterior of said cryogenic processor.

26. The method as in claim 15, wherein said means for venting an area formed between said shells of said gas diffusion chamber comprises said area formed between said shells of said gas diffusion chamber and said area formed between said shells of said freezing chamber being in fluid communication with each other.

* * * * *